United States Patent
Sakaguchi et al.

(10) Patent No.: US 7,232,495 B2
(45) Date of Patent: Jun. 19, 2007

(54) METHOD OF MAGNETIZING RARE-EARTH MAGNET AND RARE-EARTH MAGNET

(75) Inventors: Eiji Sakaguchi, Kameoka (JP); Hitoshi Morimoto, Hyogo (JP)

(73) Assignee: Neomax Co., Ltd., Osaka (JP)

( * ) Notice: Subject to any disclaimer, the term of this patent is extended or adjusted under 35 U.S.C. 154(b) by 521 days.

(21) Appl. No.: 10/485,210

(22) PCT Filed: Jul. 29, 2002

(86) PCT No.: PCT/JP02/07692

§ 371 (c)(1),
(2), (4) Date: Jan. 29, 2004

(87) PCT Pub. No.: WO03/012806

PCT Pub. Date: Feb. 13, 2003

(65) Prior Publication Data
US 2004/0206422 A1    Oct. 21, 2004

(30) Foreign Application Priority Data
Jul. 30, 2001  (JP)  ............................ 2001-230192

(51) Int. Cl.
H01F 1/053    (2006.01)
H01F 7/06     (2006.01)

(52) U.S. Cl. ............. 148/301; 148/103; 148/108; 335/297; 335/302; 29/602.1

(58) Field of Classification Search ............... None
See application file for complete search history.

(56) References Cited

U.S. PATENT DOCUMENTS

| 5,383,978 | A | 1/1995 | Yamamoto et al. |
| 6,153,952 | A | 11/2000 | Ito et al. |
| 6,432,158 | B1 | 8/2002 | Harada et al. |
| 6,448,763 | B1 * | 9/2002 | Spellman ............... 324/207.21 |

FOREIGN PATENT DOCUMENTS

| JP | 62-149109 | 7/1987 |
| JP | 10-270247 | 10/1998 |
| JP | 2002-124414 | 4/2002 |

* cited by examiner

*Primary Examiner*—John P. Sheehan
(74) *Attorney, Agent, or Firm*—Nixon Peabody LLP; Jeffrey L. Costellia

(57) ABSTRACT

The method of the present invention includes a step of preparing a rare earth magnet 22 disposed for forming a cylinder 22a, a first magnetizing step of applying a first external magnetic field H1 to the rare earth magnet 22, thereby forming a first region R1 magnetized from an inner side to an outer side of the cylinder 22a and a second region R2 magnetized from the outer side to the inner side, and a second magnetizing step of applying a second external magnetic field H2 so that an external magnetic field component forming an angle of more than 0° and less than 50° with a direction of the external magnetic field component applied in the first magnetizing step to a boundary between the first region R1 and the second region R2.

15 Claims, 5 Drawing Sheets

METHOD OF MAGNETIZING RARE-EARTH MAGNET AND RARE-EARTH MAGNET

TECHNICAL FIELD

The present invention relates to a magnetizing method for a rare earth magnet, and more particularly to a magnetizing method suitable for magnetizing a rare earth magnet which is used in a fixed condition to a rotor in a rotating machine.

BACKGROUND ART

Presently, as rare earth magnets, two kinds of magnets, i.e., rare earth/cobalt-based magnets and rare-earth/iron/boron-based magnets are widely used in various fields.

Among them, the rare-earth/iron/boron-based magnets (hereinafter, referred to as "R-T-(M)-B magnets", R is a rare earth element including Y, T is Fe or a mixture of Fe with Co and/or Ni, M is an additive element (at least one of Al, Ti, Cu, V, Cr, Ni, Ga, Zr, Nb, Mo, In, Sn, Hf, Ta, W, for example), and B is boron or a mixture of boron with carbon) exhibit the highest maximum magnetic energy product in various kinds of magnets, and they are relatively cheep. For these reasons, the R-T-(M)-B magnets are actively adopted to various electronic equipments.

For example, in order to attain high energy efficiency, or for the purposes of miniaturization, weight reduction, and the like, the rare earth magnets are used in various rotating machines (such as motors). For example, Japanese Laid-Open Patent Publication No. 2000-41372 discloses a moving-magnet type direct-current torque motor 10 as shown in FIG. 5.

The direct-current torque motor 10 includes a rotor 1 in which permanent magnets 5 and 6 are cylindrically fixed around a cylindrical iron core (soft iron, for example) 4 having an axis 3 as the center, and a stator 2 having a substantially "C" shape in which a first magnetic pole portion 7 and a second magnetic pole portion 8 disposed oppositely while keeping a predetermined gap with the rotor 1 in end portions thereof, respectively, are formed, and a coil 9 is wound around a base portion (in an upper portion of the figure). The stator 2 is formed by superposing flat rolled magnetic steel sheets and strip having a saturation magnetic flux density of 1.6 T (tesla) or more, for example.

The permanent magnets 5 and 6 disclosed in the above-identified publication are permanent magnets each having a semi-cylindrical shape (segment), and are magnetized in directions opposite to each other. For example, in the magnet 5, a front face (an outer circumference) side is the N pole, and a back face (an inner circumference) side is the S pole. On the other hand, in the magnet 6, a front face (an outer circumference) side is the S pole, and a back face (an inner circumference) side is the N pole. Instead of the magnets 5 and 6, a cylindrical magnet (not shown) which is integrally compacted can be used.

It was found that when the magnets 5 and 6 used in a rotor of the above-mentioned motor 10 were magnetized in a condition where they were disposed in a cylindrical manner, or an integrally formed cylindrical magnet was magnetized, a conventional magnetization in which a magnetic field was applied once in a diametrical direction caused a problem that a boundary portion between regions magnetized in directions opposite to each other (corresponding to the magnets 5 and 6 in FIG. 5) was not sufficiently magnetized. In such a magnet which is insufficiently magnetized, an average magnetic flux density is reduced and an angle range in which a desired surface magnetic flux density is obtained is narrowed. In addition, in an angle distribution (around an axis) of the surface magnetic flux density, an extremal value occurs in the vicinity of the boundary portion, and a linearity of the variation in the surface magnetic flux density is lowered. As a result, it may be difficult to adjust the angle of a rotating machine with good precision, or the performance of the rotating machine may not be sufficiently exercised.

DISCLOSURE OF INVENTION

The present invention has been conducted in view of the above-mentioned prior art. One of objects of the present invention is to provide a magnetizing method of, when a magnet which is disposed in a cylindrical manner is magnetized so as to form regions magnetized in directions opposite to each other, magnetizing the vicinity of the regions in a predetermined direction more surely than in the prior art. Another object of the present invention is to provide a magnet magnetized by such a magnetizing method and a high-performance rotating machine employing the magnet, especially a rotating machine in which adjustment of angle can be performed with good precision.

The magnetizing method for a rare earth magnet according to the present invention includes: a step of preparing a rare earth magnet disposed for forming a cylinder; a first magnetizing step of applying a first external magnetic field to the rare earth magnet, thereby forming a first region magnetized from an inner side to an outer side of the cylinder and a second region magnetized from the outer side to the inner side; and a second magnetizing step of applying a second external magnetic field in such a manner that an external magnetic field component in a direction for forming an angle of more than 0° and less than 50° with respect to an external magnetic field component applied in the first magnetizing step is applied to a boundary between the first region and the second region, thereby attaining the above-mentioned objects.

In a preferred embodiment, the rare earth magnet is supported in a relatively rotatable manner around an axis of the cylinder with respect to a magnetic circuit, the first magnetizing step is performed in a first position which is a relative position to the magnetic circuit, and the second magnetizing step is performed after the rare earth magnet is relatively rotated around the axis with respect to the magnetic circuit.

In a preferred embodiment, a two-pole magnet having the first region and the second region one by one along a circumference of the cylinder is formed.

Preferably, an angle formed by a direction of the external magnetic field component applied in the first magnetizing step and a direction of the external magnetic field component applied in the second magnetizing step to the boundary between the first region and the second region is 20° or more and 40° or less. More preferably, the angle is 25° or more and 35° or less.

Preferably, strengths of the first external magnetic field and the second external magnetic field are substantially equal to each other. For example, preferably, the first external magnetic field and the second external magnetic field are generated in the same conditions by using one and the same magnetic circuit, and only the relative positions thereof (angles around the axis) with respect to the magnetic circuit of the rare earth magnet are changed. As the magnetic circuit, various types of known magnetic circuits can be used.

Preferably, the rare earth magnet is a diametrically oriented anisotropic sintered magnet.

The rare earth magnet according to the invention is magnetized by using any one of the above-mentioned magnetizing methods, so that the magnet has superior magnetic properties.

The rare earth magnet according to the invention is a cylindrical rare earth magnet including: a first region magnetized from an inner side to an outer side of the cylinder; and a second region magnetized from the outer side to the inner side, wherein a surface magnetic flux density continuously varies without taking an extremal value at an boundary between the first region and the second region.

In a preferred embodiment, an angle range in which the surface magnetic flux density takes the maximum value is 120° or more and 140° or less in the first region or in the second region.

In a preferred embodiment, an angle range in which the surface magnetic flux density increases from a zero point up to the maximum value is 20° or more and 30° or less.

The rotating machine according to the present invention is provided with the rare earth magnet produced by the above-mentioned production method, so that the rotating machine has superior properties, and is suitable used for a valve opening control apparatus, or the like.

BEST MODE FOR CARRYING OUT THE INVENTION

Hereinafter, with reference to the drawings, an embodiment of a magnetizing method for a rare earth magnet according to the present invention will be described. The present invention is, however, not limited to the embodiment described below.

Figure 1A:
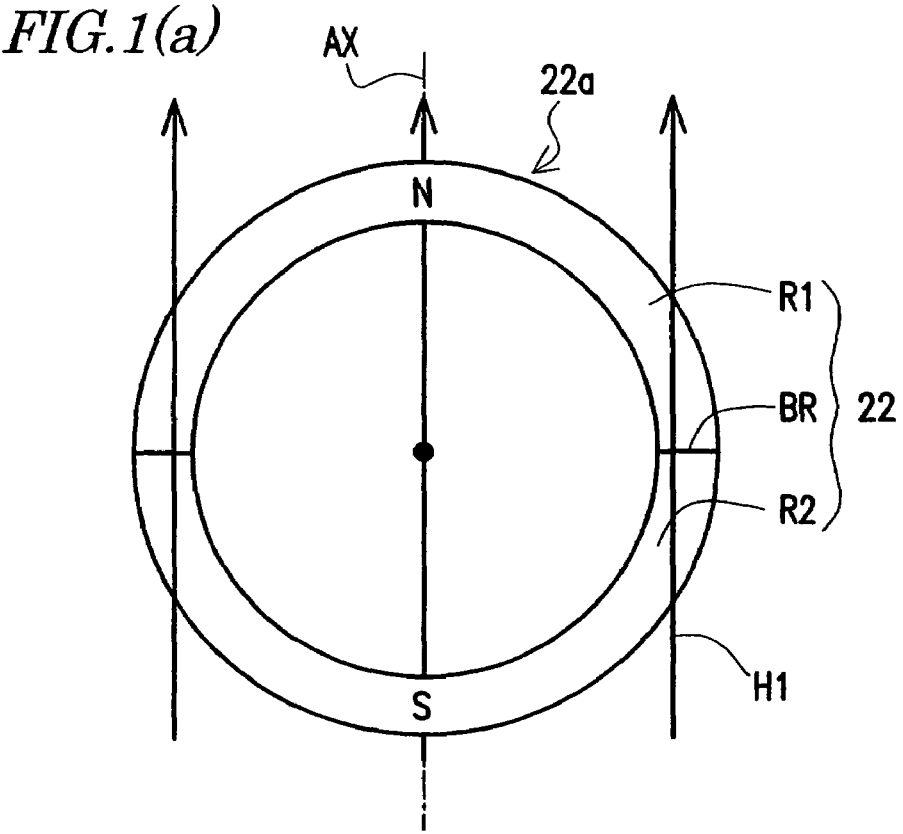
FIGS. 1($a$) and ($b$) are diagrams schematically showing a magnetizing method for a rare earth magnet according to the present invention, and after a first magnetizing step shown in ($a$), a second magnetizing step shown in ($b$) is performed.
Figure 1B:
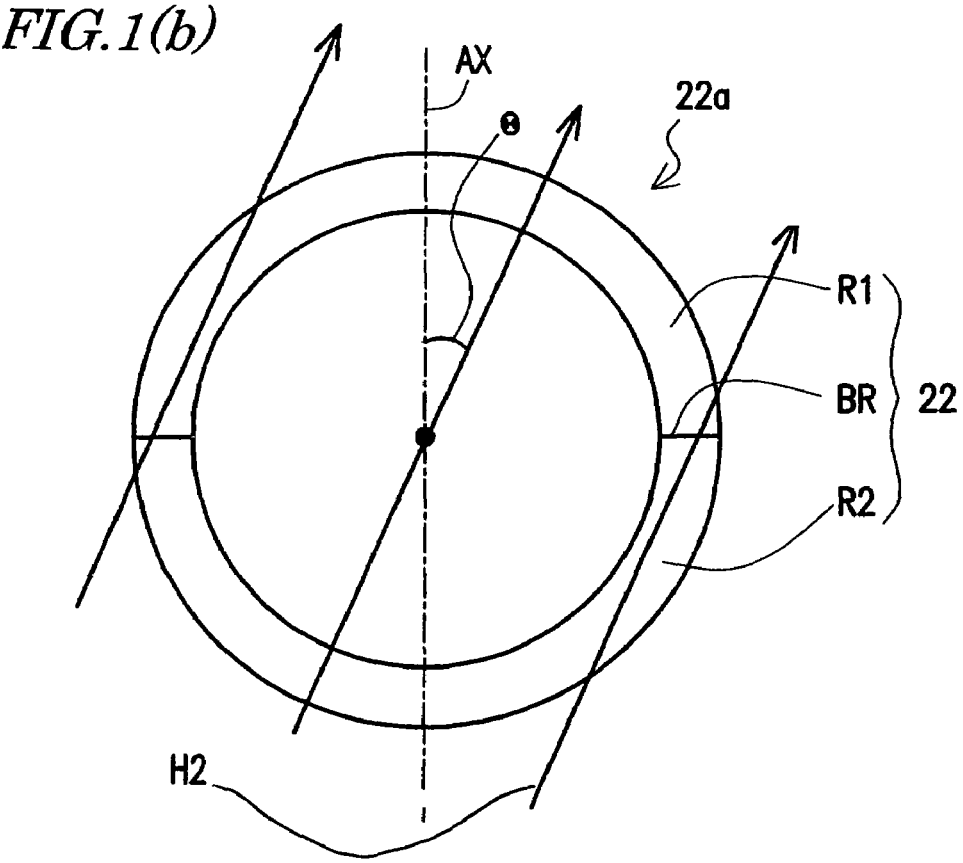

The magnetizing method for the rare earth magnet according to the present invention includes at least two magnetizing steps as shown in FIGS. 1($a$) and ($b$).

First, a rare earth magnet (for simplicity, one before magnetization is also referred to as "a magnet") 22 disposed so as to form a cylinder 22$a$ is prepared. The rare earth magnet 22 may be a rare earth magnet integrally formed, or may be a magnet in which a plurality of segment magnets are fixed to a surface of a columnar rotor (Step ($a$)).

Next, by applying a first external magnetic field H1 to the rare earth magnet 22, a first region R1 magnetized from an inner side to an outer side of the cylinder 22$a$ and a second region R2 magnetized from the outer side to the inner side are formed (Step ($b$)). At this time, the direction of magnetization of a boundary portion BR between the first region R1 and the second region R2 of the rare earth magnet 22 is not stable. Especially in an anisotropic rare earth sintered magnet of a diametrical orientation, crystal grains are oriented in a diametrical direction, so that crystal grains in the boundary portion BR are affected by a magnetizing magnetic field in a direction perpendicular to the direction of orientation (that is, a direction of tangent with respect to the cylinder 22$a$). Thus, the crystal grains in the boundary portion BR are not sufficiently magnetized. Conventionally, only this magnetizing step was performed.

In the magnetizing method of the present invention, a second external magnetic field H2 is additionally applied so that an external magnetic field component (herein represented by H2) in a direction forming an angle of more than 0° and less than 50° with a direction of the external magnetic field component (herein represented by H1) applied in the first magnetizing step is applied to the boundary portion BR between the first region R1 and the second region R2 (Step ($c$)). Depending on the second external magnetic field H2, the direction of magnetization of the crystal grains in the boundary portion BR. The strengths of the first external magnetic field H1 and the second external magnetic field H2 are preferably substantially equal to each other. The first magnetizing step and/or the second magnetizing step may be performed a plurality of times. The strengths of the external magnetic fields H1 and H2 are appropriately set in accordance with the rare earth magnet to be employed, but the strengths are set to be 2 T to 4 T in the case of a diametrical orientation R-T-(M)-B magnet.

In FIGS. 1($a$) and ($b$), for simplicity, a condition in which the external magnetic field H1 or H2 in the same direction is applied to the whole of the rare earth magnet 22 is shown, but the condition is not necessarily required. For example, external magnetic field components in different directions may be applied to the boundary portion BR and to the vicinity of the center of the respective regions R1 and R2.

Hereinafter, an embodiment employing a diametrical orientation R-T-(M)-B anisotropic sintered magnet with superior flatness in the surface magnetic flux density (the maximum value) will be described. The radial ring magnet (the reference numeral 112 in FIG. 2) employed in the embodiment will be manufactured in the following manner, for example.

First, rare earth alloy powder is prepared by a quenching method (the cooling rate of $10^2$ to $10^{4}$°C./sec.) such as strip casting (see the specification of U.S. Pat. No. 5,383,978). The powder is compacted by pressing under an aligning magnetic field having a magnetic field intensity in the cavity of 0.4 MA/m or more, thereby forming a compacted body with a density of 3.5 g/cm$^3$ or more. The obtained compacted body is sintered (in an Ar atmosphere at 1000° C. to 1100° C. for 2 to 5 hours), and is subjected to an aging (at 400° C. to 600° C. for 3 to 7 hours), thereby forming a radial ring magnet. A shape of the radial ring magnet has, for example, an outer diameter of 29 mmΦ, an inner diameter of 25 mmΦ, and a height of 12 mm. The radial ring magnet is produced by a known method, so that the detailed description of the production method is omitted (see Japanese Laid-Open Patent Publication No. 2001-192705, for example). The radial ring magnet may be formed in such a manner that a plurality of segment magnets (compacted bodies) are bonded so as to have a ring shape (a cylindrical shape). It is understood that, also in this case, the orientation of magnetic particle in the finally obtained radial ring magnet is set to be diametrical orientation, and the sintered magnet has the magnetic anisotropy in a diametrical direction from the center of the ring.

Figure 2:
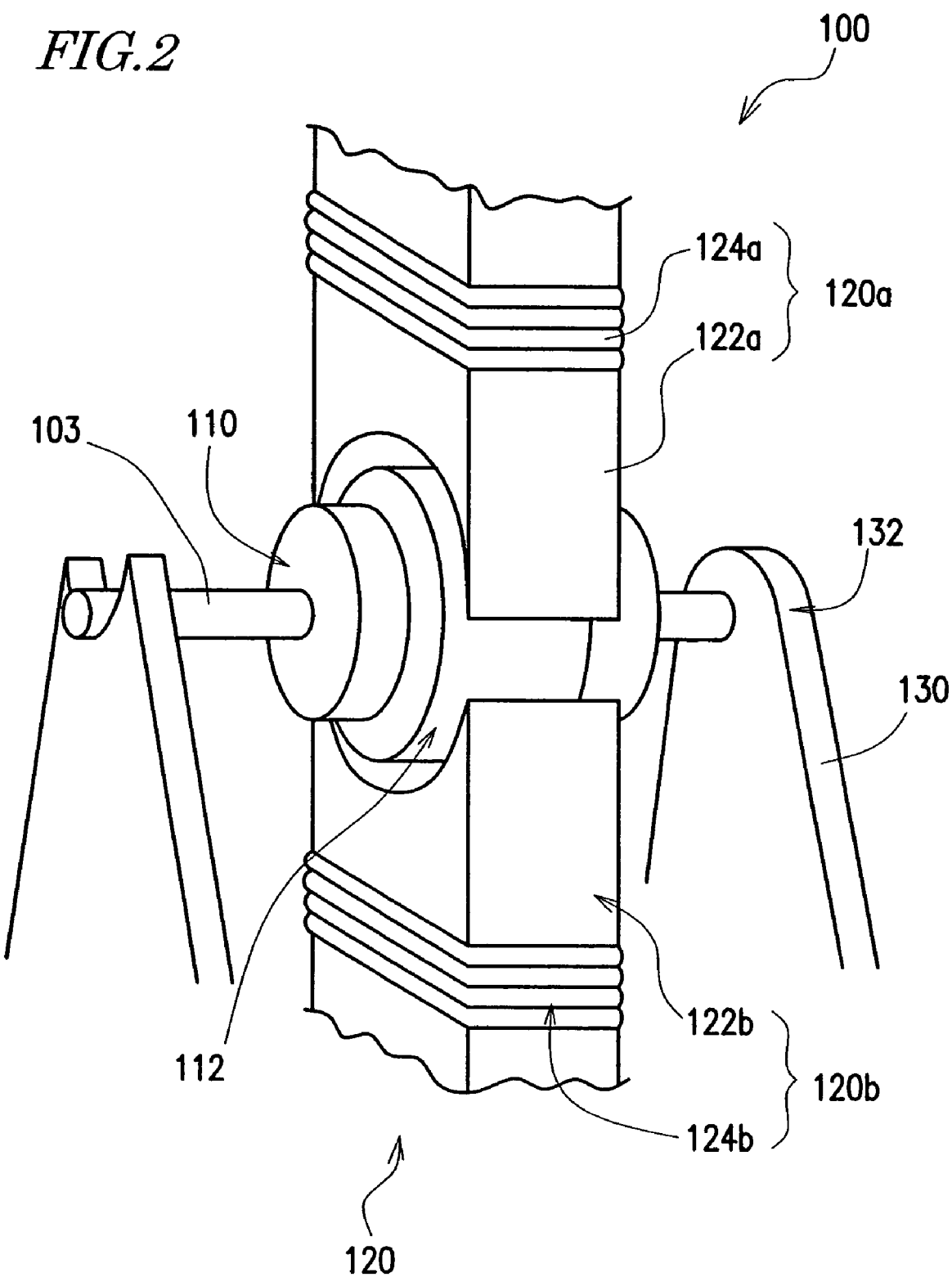
FIG. 2 is a view schematically showing a magnetizing apparatus 100 used for performing a magnetizing method in an embodiment of the present invention.

In this embodiment, the magnetization is performed by using a magnetizing apparatus 100 shown in FIG. 2.

The magnetizing apparatus 100 includes a columnar rotor 110 fixed to a shaft 103, and a magnetic circuit 120 (120a and 120b) for generating an external magnetic field for the rotor 110. The shaft 103 is supported in a rotatable manner by means of a supporting base 130. As described below, in order to change relative positions of the radial ring magnet 112 to be magnetized and the magnetic circuit 120 by a predetermined degree of rotation (θ) with the shaft 103 as a center, a rotating mechanism 132 in which grooves provided at predetermined angles are clamped may be provided. By providing such a mechanism gradually rotating by a predetermined angle, the control of the rotation angle θ can be easily performed with good reproducibility.

The magnetic circuit 120 has a yoke 122 (122a and 122b). On the yoke 122, a coil 124 (124a and 124b) connected to a capacitor power supply (not shown) is wound. On an outer circumference of the columnar rotor 110, a cylindrical radial ring magnet 112 is disposed. The magnetic circuits 120a and 120b generate an external magnetic field in a predetermined direction (H1 and H2 in FIG. 1, for example) for the radial ring magnet 112. As the magnetic circuit 120, another known magnetic circuit such as an air-core coil may be employed. In addition, by appropriately changing the shapes of magnetic poles of the magnetic circuit, a radial ring magnet having four or more poles can be magnetized.

First, in a condition where the radial ring magnet 112 was in a first position with respect to the shaft 103, a predetermined external magnetic field (about 3 T) was applied from the magnetic circuits 120a and 120b. The first position may be an arbitrary position.

Figure 3A:
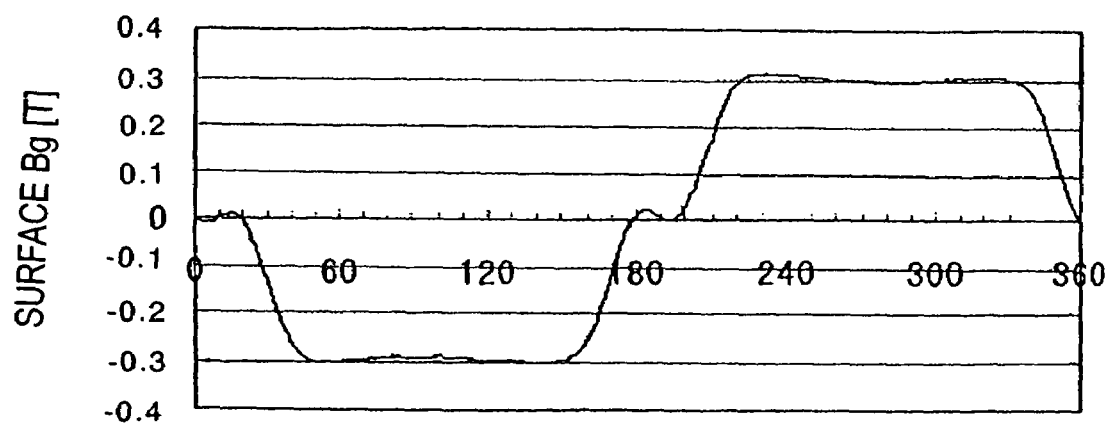
FIGS. 3($a$) to ($c$) are graphs showing dependence on angles of a surface magnetic flux density Bg of a radial ring magnet, ($a$) shows the dependence by a conventional magnetizing method, and ($b$) and ($c$) show the dependencies by the method according to the present invention.

FIG. 3(a) shows the dependence on angles of the surface magnetic flux density Bg (T: tesla) of the radial ring magnet 112 obtained by performing the first magnetizing step only, measured by a Gauss meter with a Hall element probe. As for measuring angles, a direction passing through a boundary line (equivalent to a line rectangularly crossing a line linking the center of an N region to the center of an S region) between the N-pole region of the obtained radial ring magnet 112 (a region R1 magnetized toward the outer circumference) and the S-pole region (a region R2 magnetized toward the inner circumference), and through a center axis of the radial ring magnet 112 was 0°.

Figure 3B:
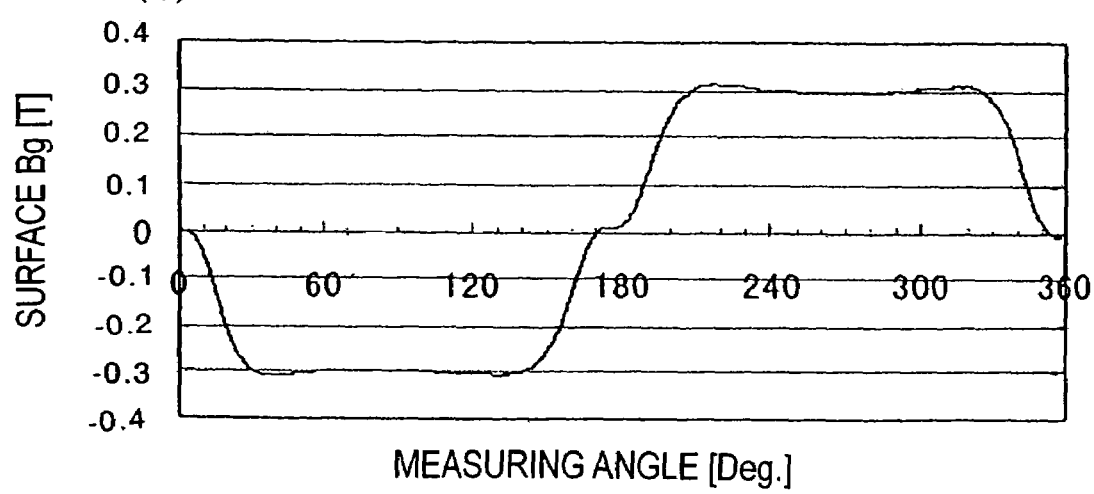
Figure 3C:
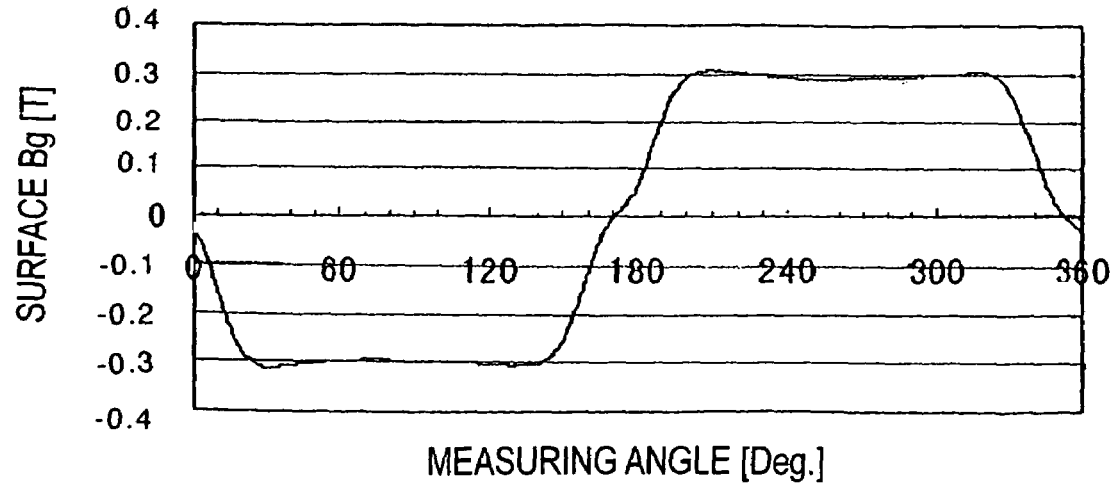

Next, after the implementation of the first magnetizing step, in the second position reached by rotating the radial ring magnet 112 by a predetermined angle θ around the shaft 103 with respect to the first position, an external magnetic field which is the same as that-in the first magnetizing step was applied. FIG. 3(b) shows the dependence on angles of the surface magnetic flux density Bg of the radial ring magnet 112 obtained at the rotation angles θ of 20° and 40° (the same results were obtained at 20° and 40°). FIG. 3(c) shows the dependence on angles of the surface magnetic flux density Bg of the radial ring magnet 112 obtained at the rotation angle of 30°.

As shown in FIGS. 3(a) to (c), the surface magnetic flux density Bg along the circumference of the radial ring magnet takes the value of 0 in the boundary portion BR between the first region R1 and the second region R2 (see FIG. 1), and thereafter, the value (an absolute value) is increased up to the maximum value in each of the first region R1 and the second region R2. Thereafter, the value experiences a flat area, and becomes zero in the boundary portion BR again. Strictly, the maximum value in each of the first region R1 and the second region R2 is the maximal value, and the value of the surface magnetic flux density Bg in the flat area is slightly smaller than the maximum value (the maximal value). Herein, the flat area between the two maximal values in the first region R1 and the second region R2, respectively, is referred to as "a maximum-value area" in which the surface magnetic flux density Bg takes the maximum value.

First, as is apparent from the graph of FIG. 3(a), the boundary portion BR between the first region R1 and the second region R2 (see FIG. 1) is not sufficiently magnetized by only one magnetizing process, so that the angle ranges of the maximum-value area in which the surface magnetic flux density Bg takes the maximum value (50° to 150°, and 220° to 330°) are narrow. In addition, an average magnetic flux density is low. Moreover, the surface magnetic flux density Bg is not continuously varied in the vicinity of the boundary portion BR, but takes the extremal value (the maximal value and the minimal value). In the vicinity of the boundary portion BR, the angle range from the zero point to the maximum value of the surface magnetic flux density Bg exceeds 30°.

As described above, if the magnetization is performed only by the first magnetizing step, the angle range of the maximum-value area of the surface magnetic flux density Bg is less than 120° which is relatively narrow in each of the first region R1 and the second region R2. In addition, the extremal value appears in the variation of the surface magnetic flux density Bg in the boundary portion BR between the first region R1 and the second region R2. Therefore, if a rotating machine is configured, for example, by using the radial ring magnet 122 having the above-described properties, not only the energy efficiency is low, but also large vibration occurs. Moreover, it is difficult to produce a precise position (angle) sensor with such a radial ring magnet.

On the other hand, as shown in FIGS. 3(b) and (c), it is found that, as for the properties of the radial ring magnet obtained by the magnetizing method of the present invention, the angle range in which the surface magnetic flux density Bg takes the maximum value is wide, and the average magnetic flux density is high. The angle range of the maximum area is 30° to 150° and 210° to 330° in the example shown in FIG. 3(b), and 20° to 150° and 195° to 330° in the example shown in FIG. 3(c).

In the vicinity of the boundary portion BR between the first region R1 and the second region R2, the surface magnetic flux density monotonically increases or decreases, so that the extremal value (the maximal value or the minimal value) seen in FIG. 3(a) does not exist. Especially, in the radial ring magnet 112 in the case where the rotation angle θ is 30° shown in FIG. 3(c), the angle range taking the maximum value is wide and the average magnetic flux density is high. In addition, it is found that the variation of the surface magnetic flux density Bg in the vicinity of the boundary portion BR between the first region R1 and the second region R2 is very smooth.

As described above, by performing the first magnetizing step and the second magnetizing step, a radial ring magnet having the angle range of the maximum value area of the surface magnetic flux density Bg of 120° to 140° and the angle range in which the surface magnetic flux density Bg increases from the zero point up to the maximum value of 20° to 30° can be obtained. The surface magnetic flux density Bg of the radial ring magnet monotonically increases or decreases without taking the extremal value in the vicinity of the boundary portion BR between the first region R1 and the second region R2, so that the linearity of the variation of the surface magnetic flux density Bg is high.

Figure 4:
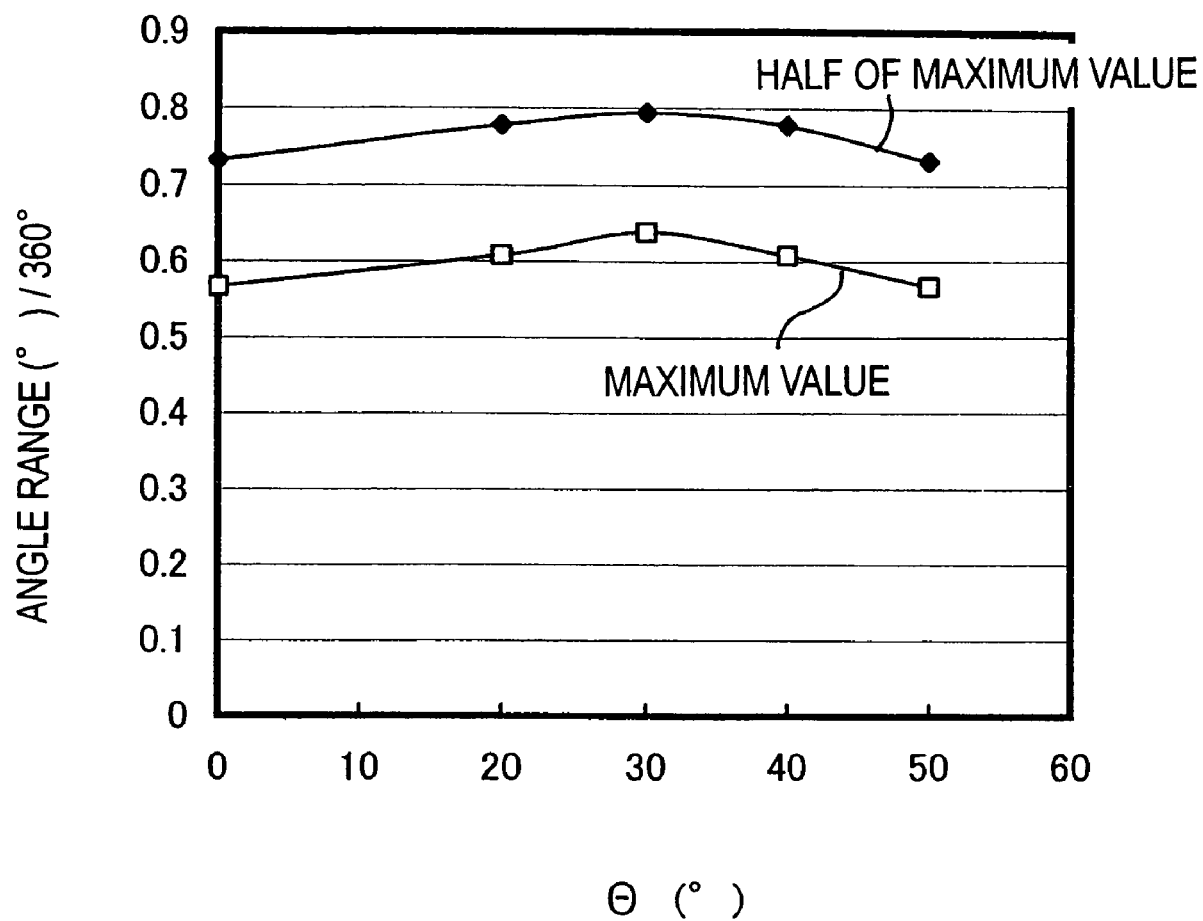
FIG. 4 is a graph for explaining a difference in magnetic properties of a radial ring magnet depending on a rotation angle $\theta$.

FIG. 4 shows the results by plotting values obtained by dividing the angle range in which the surface magnetic flux density Bg of various radial ring magnets 112 obtained by changing the rotation angle θ takes the maximum value and the angle range in which the surface magnetic flux density takes a value which is the half or more of the maximum value by 360 degrees, with respect to the rotation angle θ. The rotation angle θ=0° shows the case where only the first magnetizing step is performed. When the rotation angle θ was 50°, substantially the same results as those in the case of θ=0° could be obtained.

As is apparent from the graph in FIG. 4, it is found that, by adopting the magnetizing method of the present invention and setting the rotation angle θ so as to be more than 0° and less than 50°, the angle range in which the surface magnetic flux density Bg takes the maximum value and the angle range in which the surface magnetic flux density takes a value which is the half of the maximum value are increased as compared with the prior-art magnetizing method (corresponding to the rotation angle θ=0° in FIG. 4). In addition, by setting the rotation angle θ to be in the range of 20° to 40°, as shown in FIG. 3(b), there appears no extremal value in the variation of the surface magnetic flux density Bg in the boundary portion BR between the first region R1 and the second region R2, and the surface magnetic flux density varies continuously and smoothly. In addition, by setting the rotation angle θ to be 30°±5°, the variation of the surface magnetic flux density Bg in the boundary portion BR is more smooth. As shown in FIG. 3(c), when the rotation angle θ is about 30°, the surface magnetic flux density Bg is most smoothly varied.

Figure 5:
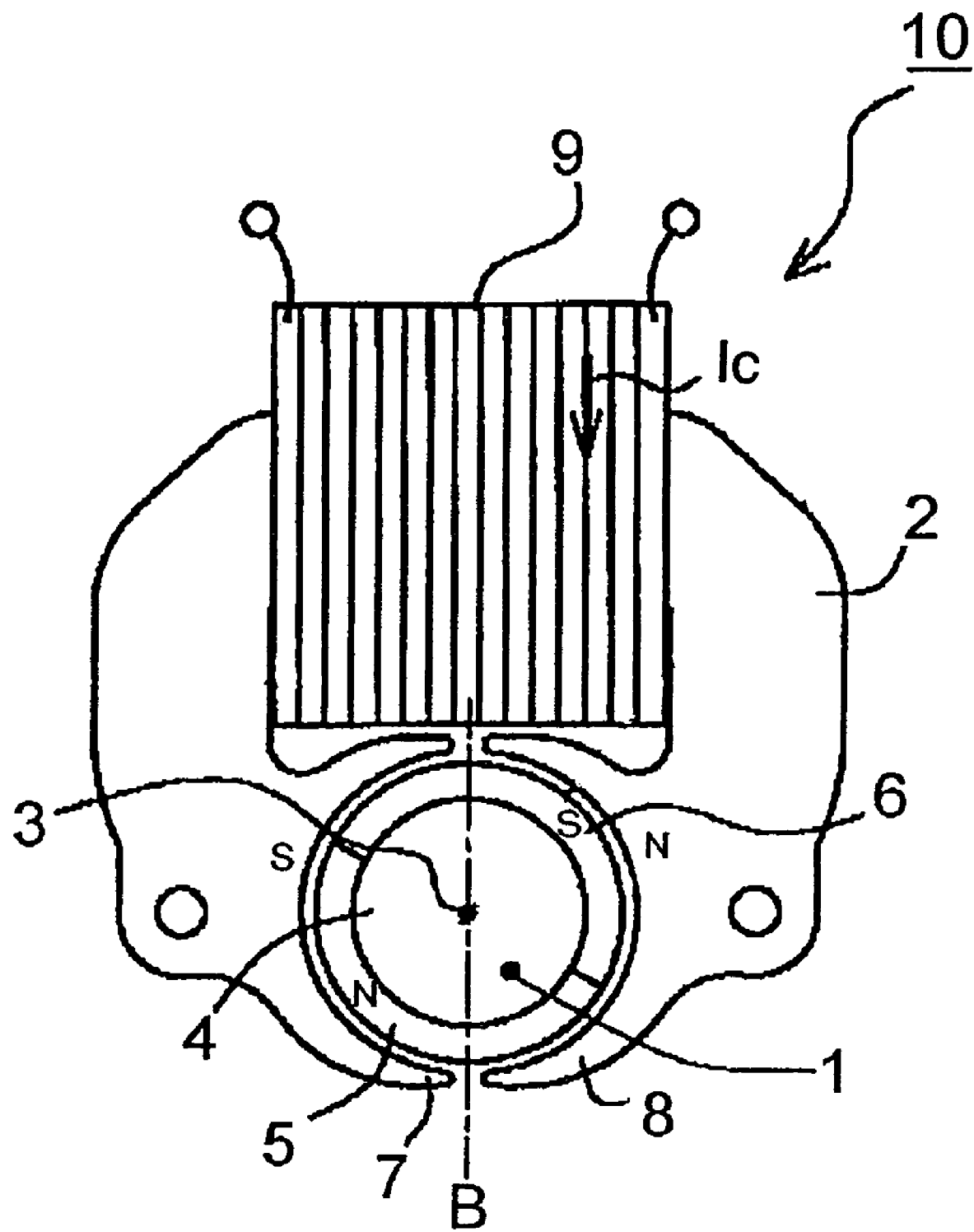
FIG. 5 is a view showing a known rotating machine in which a rare earth magnet according to the present invention is suitably used.

As described above, by the magnetizing method according to the present invention, a radial ring magnet in which a boundary portion BR between regions magnetized in directions opposite to each other (the first region R1 and the second region R2) is magnetized more surely than in the prior art can be obtained. If a rotating machine as shown in FIG. 5 is configured by using such a radial ring magnet, the obtained rotating machine has high energy efficiency and less vibration. Such a rotating machine is suitably used for an application in which angles are required to be controlled with high precision such as a control apparatus for a slot value, as disclosed in Japanese Laid-Open Patent Publication

INDUSTRIAL APPLICABILITY

According to the present invention, a magnetizing method in which, when magnets disposed in a cylindrical manner so as to form regions magnetized in directions opposite to each other are to be magnetized, the vicinity of the boundary between the regions is magnetized in a predetermined direction more surely than in the prior art can be provided. In addition, by using a magnet magnetized by such a magnetizing method, a rotating machine with high performance can be provided. When a rare earth magnet according to the present invention is used, torque ripple in a motor, an actuator, or the like is reduced, and the energy efficiency is improved.

Especially, a magnet obtained by magnetizing a diametrical orientation R-T-(M)-B sintered magnet by the magnetizing method of the present invention is suitably used in a high-performance rotating machine or a high-precision sensor for detecting a position (an angle). It is understood that the present invention is not limited to the rare earth sintered magnet, and the present invention can be used for magnetizing various rare earth magnets such as a bonded magnet.

The invention claimed is:

1. A magnetizing method for a rare earth magnet comprising:
    preparing a rare earth magnet having a cylindrical shape;
    a first magnetizing step of applying a first external magnetic field to the rare earth magnet, thereby forming a first region magnetized from an inner side to an outer side of the cylinder and a second region magnetized from the outer side to the inner side; and
    a second magnetizing step of applying a second external magnetic field in such a manner that an external magnetic field component in a direction for forming an angle of more than 0° and less than 50° with respect to an external magnetic field component applied in the first magnetizing step is applied to a boundary between the first region and the second region.

2. The magnetizing method for a rare earth magnet of claim 1, wherein the rare earth magnet is supported in a relatively rotatable manner around an axis of the cylinder with respect to a magnetic circuit, and the first magnetizing step is performed in a first position which is a relative position to the magnetic circuit, and
    the second magnetizing step is performed after the rare earth magnet is relatively rotated around the axis with respect to the magnetic circuit.

3. The magnetizing method for a rare earth magnet of claim 1 or 2, wherein a two-pole magnet having the first region and the second region one by one along a circumference of the cylinder is formed.

4. The magnetizing method for a rare earth magnet of claim 1, wherein an angle formed by a direction of the external magnetic field component applied in the first magnetizing step and a direction of the external magnetic field component applied in the second magnetizing step to the boundary between the first region and the second region is 20° or more and 40° or less.

5. The magnetizing method for a rare earth magnet of claim 1 or 2, wherein strengths of the first external magnetic field and the second external magnetic field are substantially equal to each other.

6. The magnetizing method for a rare earth magnet of claim 1 or 2, wherein the rare earth magnet is a diametrically oriented anisotropic sintered magnet.

7. A production method for a rare earth magnet comprising a magnetizing step performed by the magnetizing method of claim 1.

8. A rare earth magnet produced by the production method of claim 7, wherein the direction of magnetization in the first region is not the same as the direction of magnetization in the second region.

9. A rare earth magnet which is cylindrical, comprising:
    a first region magnetized from an inner side to an outer side of the cylinder; and
    a second region magnetized from the outer side to the inner side,
    wherein a surface magnetic flux density continuously varies without taking an extremal value at an boundary between the first region and the second region, and
    wherein the direction of magnetization in the first region is not the same as the direction of magnetization in the second region.

10. The rare earth magnet of claim 9, wherein an angle range in which the surface magnetic flux density takes the maximum value is 120° or more and 140° or less in the first region or in the second region.

11. The rare earth magnet of claim 9 or 10, wherein an angle range in which the surface magnetic flux density increases from a zero point up to the maximum value is 20° or more and 30° or less.

12. A rotating machine provided with the rare earth magnet of any one of claims 8 to 10.

13. A valve opening control apparatus provided with the rotating machine of claim 12.

14. A rotating machine provided with the rare earth magnet of claim 11.

15. A valve opening control apparatus provided with the rotating machine of claim 14.

* * * * *